(12) United States Patent
Park et al.

(10) Patent No.: US 11,351,890 B2
(45) Date of Patent: Jun. 7, 2022

(54) SEAT CROSSMEMBER AND VEHICLE FLOOR STRUCTURE HAVING THE SAME

(71) Applicants: Hyundai Motor Company, Seoul (KR); Kia Motors Corporation, Seoul (KR)

(72) Inventors: Hyun Wook Park, Daegu (KR); Seung Min Jeong, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 68 days.

(21) Appl. No.: 16/995,244

(22) Filed: Aug. 17, 2020

(65) Prior Publication Data

US 2021/0170915 A1 Jun. 10, 2021

(30) Foreign Application Priority Data

Dec. 6, 2019 (KR) .................. 10-2019-0161993

(51) Int. Cl.
| | | |
|---|---|---|
| *B60N 2/015* | (2006.01) | |
| *B62D 25/20* | (2006.01) | |
| *B62D 25/02* | (2006.01) | |
| *B60K 1/04* | (2019.01) | |
| *B62D 65/14* | (2006.01) | |

(52) U.S. Cl.
CPC .............. *B60N 2/015* (2013.01); *B60K 1/04* (2013.01); *B62D 25/025* (2013.01); *B62D 25/2036* (2013.01); *B62D 65/14* (2013.01)

(58) Field of Classification Search
CPC .. B60N 2/015; B62D 25/2036; B62D 25/025; B60K 1/04

USPC .................. 296/204, 30, 193.07, 187.08
See application file for complete search history.

(56) References Cited

U.S. PATENT DOCUMENTS

| | | | |
|---|---|---|---|
| 2013/0229030 A1* | 9/2013 | Yamaguchi | B60L 50/66 296/193.07 |
| 2014/0327268 A1* | 11/2014 | Mori | B62D 25/2036 296/187.08 |
| 2017/0036700 A1* | 2/2017 | Patel | B62D 25/2036 |
| 2018/0065506 A1* | 3/2018 | Maier | B62D 21/03 |
| 2019/0009661 A1* | 1/2019 | Okamura | H01M 50/20 |
| 2019/0181398 A1* | 6/2019 | Shimada | B60L 50/66 |
| 2019/0291556 A1* | 9/2019 | Caliskan | B60L 50/64 |

FOREIGN PATENT DOCUMENTS

| | | |
|---|---|---|
| JP | 2010149174 A | 7/2010 |
| JP | 2015157595 A | 9/2015 |
| KR | 100276215 B1 | 12/2000 |
| KR | 20150019047 A | 2/2015 |

* cited by examiner

*Primary Examiner* — D Glenn Dayoan
*Assistant Examiner* — E Turner Hicks
(74) *Attorney, Agent, or Firm* — Slater Matsil, LLP (57) ABSTRACT

A seat crossmember includes a base facing a floor of a vehicle, a first reinforcing portion connected to a first edge of the base, wherein the first reinforcing portion has a first cavity, and a second reinforcing portion integrally connected to a second edge of the base, wherein the second reinforcing portion has a second cavity. The first cavity and the second cavity can be closed cavities. The first reinforcing portion and the second reinforcing portion can protrude upwardly from the base, and the first reinforcing portion, the second reinforcing portion, and the base can define a third cavity.

18 Claims, 8 Drawing Sheets

SEAT CROSSMEMBER AND VEHICLE FLOOR STRUCTURE HAVING THE SAME

CROSS-REFERENCE TO RELATED APPLICATIONS

This application claims priority to Korean Patent Application No. 10-2019-0161993, filed in the Korean Intellectual Property Office on Dec. 6, 2019, which application is hereby incorporated herein by reference.

TECHNICAL FIELD

The present disclosure relates to a seat crossmember on which a vehicle seat is mounted.

BACKGROUND

These days, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

An electric vehicle is equipped with a battery assembly which is mounted to a vehicle body. The battery assembly includes one or more battery cells (or a battery module), electric/electronic components associated with the battery cells, and a battery case in which the battery cells and the electric/electronic components are mounted. The battery assembly may be mounted under a floor of the vehicle body.

An existing electric vehicle has a range of approximately 90 to 100 miles. In order to increase the range of the electric vehicle to 200 miles or more, it is required to increase the capacity of a battery. As the capacity of the battery increases, the volume of the battery assembly may be increased by 1.5 times or more. As a result, it is difficult to arrange structural members, reinforcements, and mounting brackets for mounting the battery assembly on the floor of the vehicle body. In addition, it is difficult to ensure crashworthiness and stiffness of the vehicle body.

Meanwhile, a seat crossmember for mounting the vehicle seat may be joined to the floor. The seat crossmember may reinforce the stiffness and torsional stiffness of the floor.

According to the related art, the battery assembly is joined to the seat crossmember by means of brackets and the like. Since the battery assembly and the seat crossmember are not directly joined, the mounting stiffness of the battery assembly may be relatively reduced.

In addition, while an existing seat crossmember is relatively heavy, its own stiffness and strength are relatively weak, which makes it difficult to improve the mounting stiffness of the battery assembly and the torsional stiffness of the vehicle body.

The above information described in this background section is provided to assist in understanding the background of the inventive concept, and may include any technical concept which is not considered as the prior art that is already known to those skilled in the art.

SUMMARY

The present disclosure relates to a seat crossmember on which a vehicle seat is mounted. Particular embodiments relate to a seat crossmember capable of improving its own stiffness and strength and reducing its own weight and a vehicle floor structure having the same.

The embodiments of the present disclosure have been made to solve problems occurring in the prior art while advantages achieved by the prior art are maintained intact.

An embodiment of the present disclosure provides a seat crossmember capable of improving its own stiffness and strength and reducing its own weight, and a vehicle floor structure having the same.

According to an embodiment of the present disclosure, a seat crossmember may include a base facing a floor of a vehicle, and a first reinforcing portion and a second reinforcing portion integrally connected to both edges of the base, wherein the first reinforcing portion may have a first cavity, and the second reinforcing portion may have a second cavity.

The first cavity and the second cavity may be closed cavities.

The first reinforcing portion and the second reinforcing portion may protrude upwardly from the base, and the first reinforcing portion, the second reinforcing portion, and the base may define a third cavity.

The seat crossmember may further include an upper member disposed above the base, and the upper member may be joined to the first reinforcing portion and the second reinforcing portion to close a top of a third cavity.

The seat crossmember may further include a reinforcing member attached to a bottom surface of the base, and the reinforcing member may support a nut for mounting a battery assembly.

According to another embodiment of the present disclosure, a vehicle floor structure may include a floor disposed on a bottom of a vehicle body, a plurality of seat crossmembers extending in a width direction of a vehicle, a pair of side sills disposed on both sides of the floor, and a pair of side sill reinforcements mounted in the pair of side sills, respectively, wherein each seat crossmember may include a base mounted on the floor, and a first reinforcing portion and a second reinforcing portion integrally connected to both edges of the base.

The plurality of seat crossmembers may be joined to the pair of side sills through a plurality of joint brackets.

Each joint bracket may include an inner flange joined to an end portion of the seat crossmember, and an outer flange joined to the side sill.

Each side sill reinforcement may be mounted in the corresponding side sill through a plurality of mounting brackets, and at least some mounting brackets among the plurality of mounting brackets may be aligned with the joint brackets.

At least some joint brackets among the plurality of joint brackets may further include a seat mounting portion raised upwardly from the inner flange.

The seat crossmember may further include a reinforcing member attached to a bottom surface of the base, the reinforcing member may support a nut, and a bolt may be fastened to the nut while passing through a battery case of a battery assembly.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
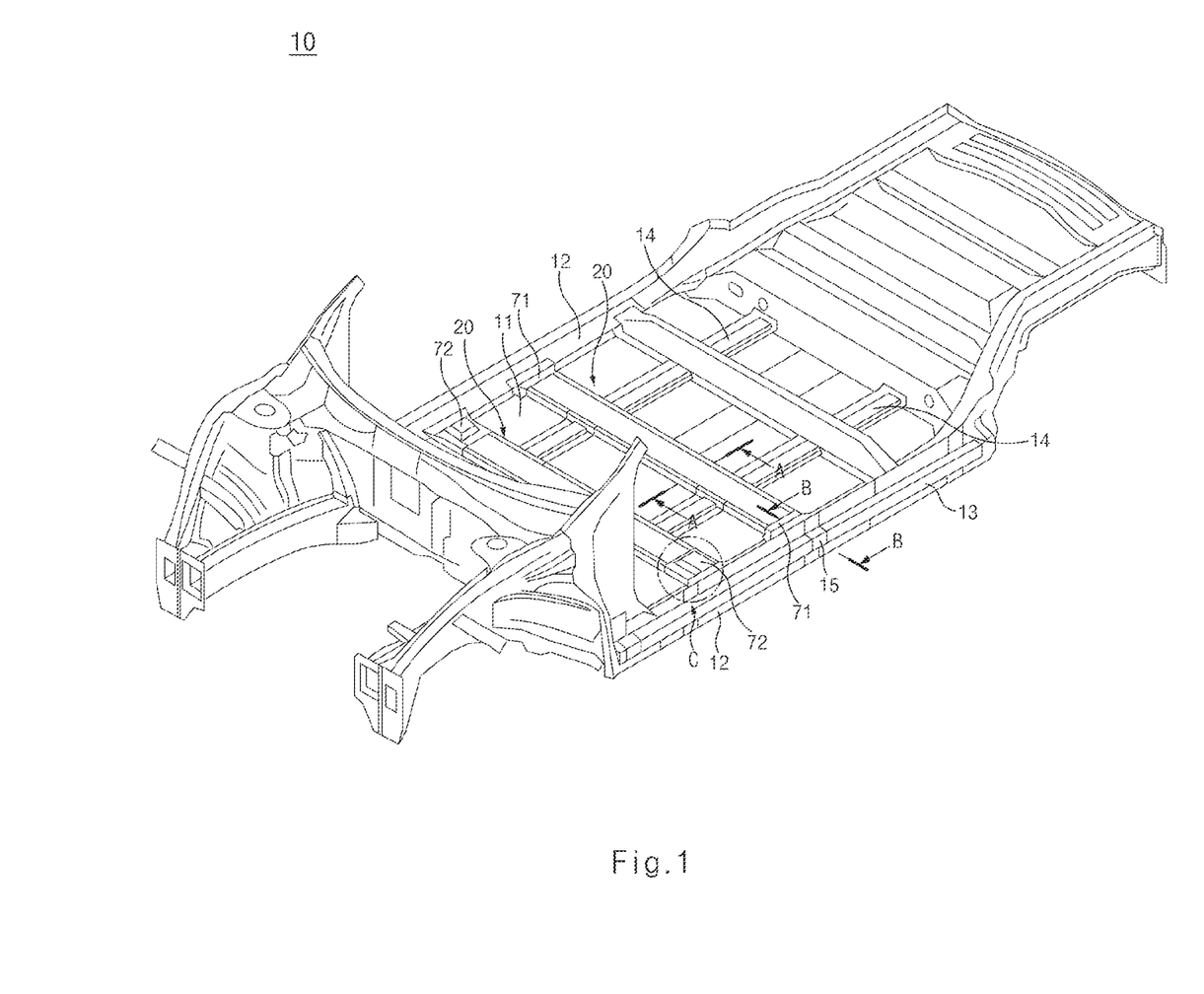
FIG. 1 illustrates a perspective view of a vehicle floor structure according to an exemplary embodiment of the present disclosure.
Figure 2:
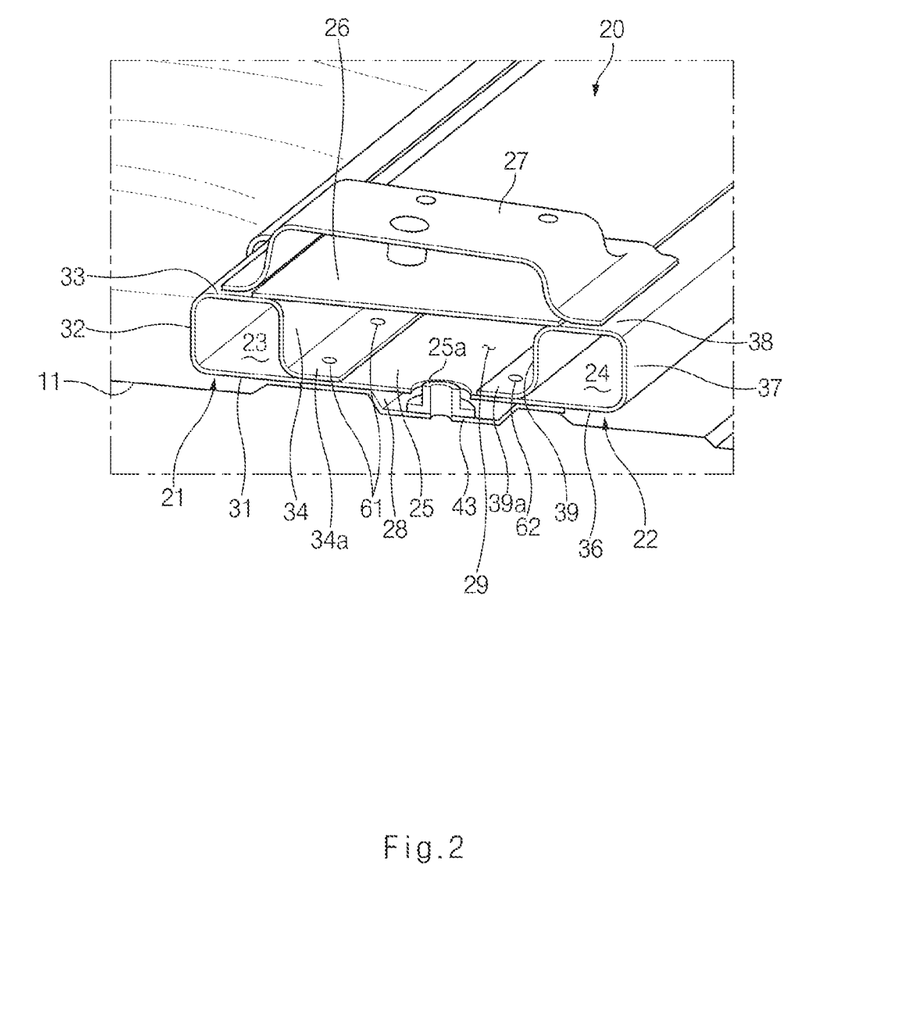
FIG. 2 illustrates a cross-sectional view taken along line A-A of FIG. 1.

Referring to FIGS. 1 and 2, a vehicle floor structure 10 according to an exemplary embodiment of the present disclosure may include a floor 11 disposed on the bottom of a vehicle body, a plurality of seat crossmembers 20 extending in a width direction of the vehicle, a pair of side sills 12 disposed on both sides of the floor 11, and a pair of side sill reinforcements 13 mounted in the pair of side sills 12, respectively.

The floor 11 may be disposed on the bottom of the vehicle body to form a floor of the vehicle. The plurality of seat crossmembers 20 may be disposed on the floor 11, and each seat crossmember 20 may connect the pair of side sills 12 along the width direction of the vehicle. A plurality of rail members 14 perpendicular to the plurality of seat crossmembers 20 may be disposed on the floor 11. End portions of each seat crossmember 20 may be joined to the corresponding side sills 12 through joint brackets 71 or 72. Each side sill 12 may extend in a longitudinal direction of the vehicle. The side sills 12 may be mounted on side edges of the floor 11, respectively, and thus the pair of side sills 12 may be spaced apart from each other in a width direction of the floor 11.

The seat crossmember 20 may have a tubular shape with one or more closed cavities. According to an exemplary embodiment, the seat crossmember 20 may be roll-formed from sheet metal. That is, the seat crossmember 20 may be produced by a roll-forming method. For example, the seat crossmember 20 may be made of advanced high strength steel (AHSS) of 100K or more.

Figure 3:
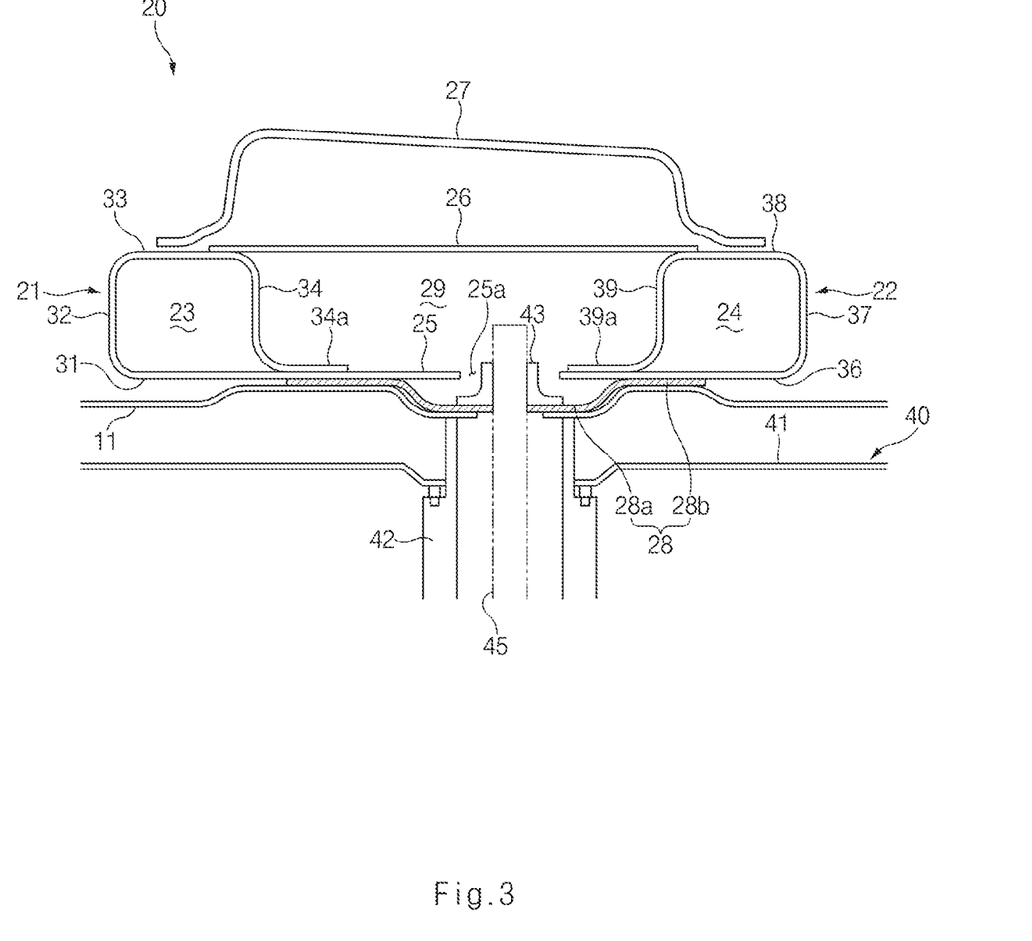
FIG. 3 illustrates a cross-sectional view of a seat crossmember according to an exemplary embodiment of the present disclosure.

Referring to FIGS. 2 and 3, the seat crossmember 20 may include a base 25 facing the floor 11, and a first reinforcing portion 21 and a second reinforcing portion 22 integrally connected to the base 25. The base 25 includes a first edge, and a second edge opposed to the first edge. The first reinforcing portion 21 is integrally formed along a first edge of the base 25, and the second reinforcing portion 22 is integrally formed along a second edge of the base 25.

The base 25 may have a flat surface, and the base 25 may be joined to the floor 11 by using fasteners, welding, and/or the like so that it may directly face the floor 11. The base 25 may have an opening 25a which receives a nut 43 and a bolt 45 for mounting a battery assembly 40.

As the first reinforcing portion 21 and the second reinforcing portion 22 are disposed on the pair of opposed edges of the base 25, the first reinforcing portion 21 and the second reinforcing portion 22 may be spaced apart from each other in a width direction of the seat crossmember 20. The first reinforcing portion 21 and the second reinforcing portion 22 may extend in a longitudinal direction of the seat crossmember 20. The first reinforcing portion 21 and the second reinforcing portion 22 may protrude upwardly from the base 25, and thus the base 25 may define a third cavity 29 together with the first reinforcing portion 21 and the second reinforcing portion 22.

The first reinforcing portion 21 may have a first cavity 23, and the first cavity 23 may be a closed cavity defined by a first bottom wall 31, a first outboard sidewall 32, a first top wall 33, and a first inboard sidewall 34. The first bottom wall 31 may extend horizontally from the base 25. In particular, the first bottom wall 31 may be flush with the base 25. The first outboard sidewall 32 may extend upwardly and vertically from the first bottom wall 31. The first top wall 33 may extend horizontally from the first outboard sidewall 32, and the first top wall 33 may be spaced apart from the opposing first bottom wall 31. The first inboard sidewall 34 may extend vertically from the first top wall 33 toward the base 25, and the first inboard sidewall 34 may be spaced apart from the opposing first outboard sidewall 32. A first flange 34a may extend from a bottom end of the first inboard sidewall 34, and the first flange 34a may be overlapped with the base 25. The first flange 34a may be joined to the base 25 by welding (for example, spot welding).

The second reinforcing portion 22 may have a second cavity 24, and the second cavity 24 may be a closed cavity defined by a second bottom wall 36, a second outboard sidewall 37, a second top wall 38, and a second inboard sidewall 39. The second bottom wall 36 may extend horizontally from the base 25. In particular, the second bottom wall 36 may be flush with the base 25. That is, the first bottom wall 31 of the first reinforcing portion 21 and the second bottom wall 36 of the second reinforcing portion 22 may be flush with the base 25. The second outboard sidewall 37 may extend upwardly and vertically from the second bottom wall 36. The second top wall 38 may extend horizontally from the second outboard sidewall 37, and the second top wall 38 may be spaced apart from the opposing second bottom wall 36. The second inboard sidewall 39 may extend vertically from the second top wall 38 toward the base 25, and the second inboard sidewall 39 may be spaced apart from the opposing second outboard sidewall 37. A second flange 39a may extend from a bottom end of the second inboard sidewall 39, and the second flange 39a may be overlapped with the base 25. The second flange 39a may be joined to the base 25 by welding (for example, spot welding).

The first flange 34a and the second flange 39a may be joined to both sides of the base 25, allowing the first reinforcing portion 21 and the second reinforcing portion 22 to firmly keep their shapes on both sides of the base 25, improving the stiffness and strength of the seat crossmember 20, and easily reducing the weight of the seat crossmember 20.

The seat crossmember 20 may be joined to the floor 11 by welding. In particular, the base 25 of the seat crossmember 20 may be joined to the floor 11 by a plurality of spot welds 61 and 62.

A plurality of first spot welds 61 may be spaced apart from each other in a longitudinal direction of the first flange 34a and the base 25, and a plurality second spot welds 62 may be spaced apart from each other in the longitudinal direction of the second flange 39a and the base 25.

The seat crossmember 20 may further include an upper member 26 disposed above the base 25, and the upper member 26 may be spaced upwardly apart from the base 25. For example, the upper member 26 may be made of advanced high strength steel (AHSS) of 100K or more. Both edges of the upper member 26 may be joined to the first reinforcing portion 21 and the second reinforcing portion 22 by welding and/or the like, and thus the upper member 26 may close the top of the third cavity 29. The upper member 26 may be disposed at a height corresponding to a mounting height of a vehicle seat. A seat mounting bracket 27 for mounting the vehicle seat may be disposed above the upper member 26. The seat mounting bracket 27 may be joined to the upper member 26 or the first and second reinforcing portions 21 and 22 by welding, using fasteners, and/or the like.

According to an exemplary embodiment, the upper member 26 may have a plate structure joined to the first top wall 33 of the first reinforcing portion 21 and the second top wall 38 of the second reinforcing portion 22 as illustrated in FIG. 3.

Figure 4:
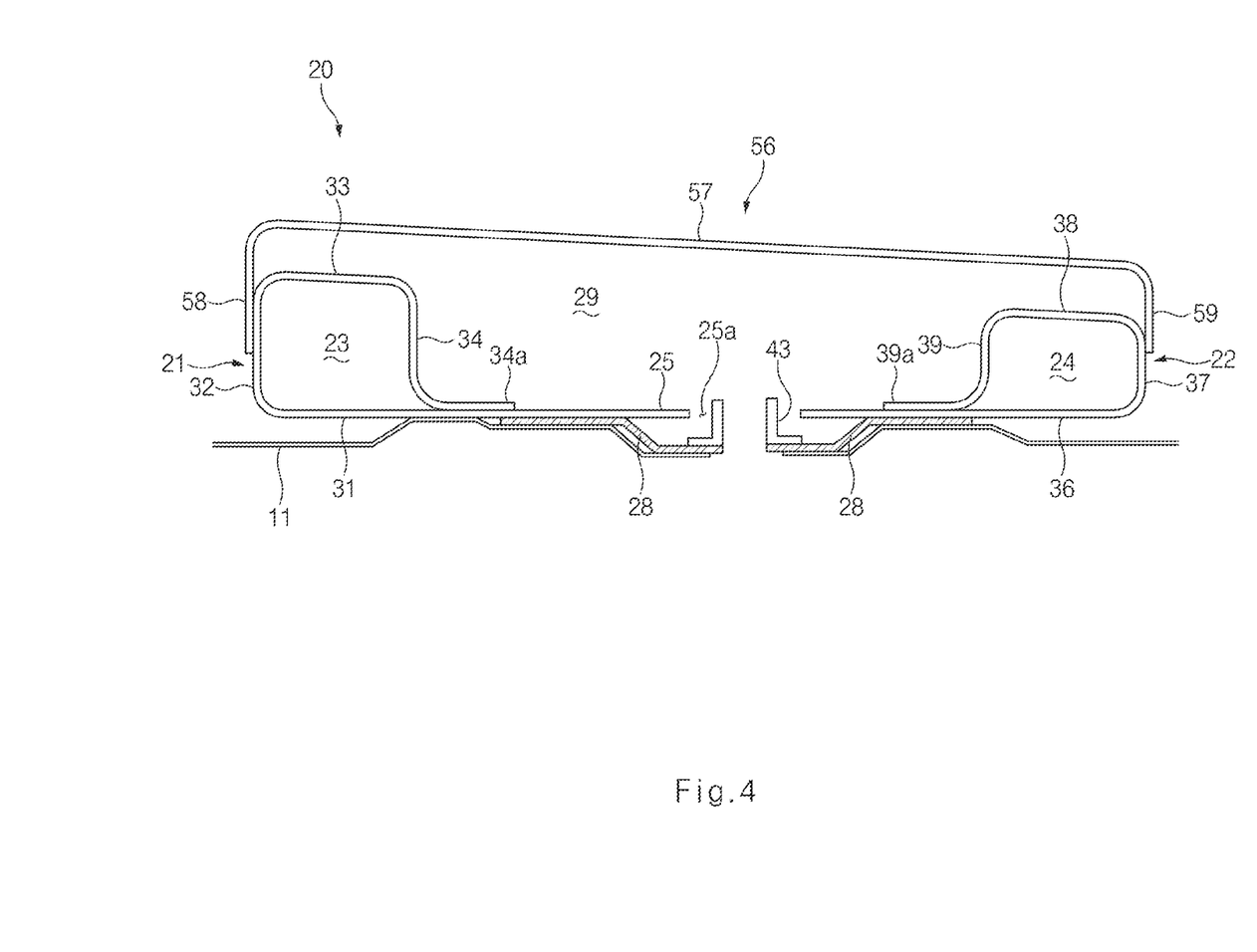
FIG. 4 illustrates a modification to the embodiment of FIG. 3.

According to another exemplary embodiment, an upper member 56 may include a flat portion 57 and first and second flanges 58 and 59 extending from both edges of the flat portion 57 as illustrated in FIG. 4. The first and second flanges 58 and 59 may be roll-formed from the flat portion 57. The first flange 58 may extend toward the first reinforcing portion 21, and the second flange 59 may extend toward the second reinforcing portion 22. The first flange 58 may be joined to the first outboard sidewall 32 of the first reinforcing portion 21 by welding, using fasteners, and/or the like, and the second flange 59 may be joined to the second outboard sidewall 37 of the second reinforcing portion 22 by welding, using fasteners, and/or the like. By adjusting the connection positions of the first flange 58 and the second flange 59, the upper member 56 may be easily disposed at a height corresponding to the mounting height of the vehicle seat.

Referring to FIGS. 3 and 4, the first reinforcing portion 21 and the second reinforcing portion 22 may protrude upwardly from both edges of the base 25. The third cavity 29 may be a closed cavity defined by the base 25, the first reinforcing portion 21, the second reinforcing portion 22, and the upper member 26 or 56. The seat crossmember 20 may have the first cavity 23, the second cavity 24, and the third cavity 29, and thus its own strength and stiffness may be significantly improved, and its material used may be minimized, resulting in significantly reduced material cost and weight.

The seat crossmember 20 according to an exemplary embodiment of the present disclosure may further include a reinforcing member 28 attached to a bottom surface of the base 25, and the reinforcing member 28 may include a support portion 28a supporting the nut 43 for mounting the battery assembly 40, and a flange 28b protruding upwardly from both edges of the support portion 28a. The nut 43 may be fixed to the support portion 28a by welding, and the flange 28b of the reinforcing member 28 may be fixed to the bottom surface of the base 25 by welding, using fasteners, and/or the like. The support portion 28a may have an opening corresponding to a hole of the nut 43, and the bolt 45 may be fastened to the nut 43 while passing through a battery case 41 of the battery assembly 40. In detail, a pipe 42 passing through the battery case 41 of the battery assembly 40 may be positioned below the reinforcing member 28, and the bolt 45 may be fastened to the nut 43 through the pipe 42 so that the battery assembly 40 may be directly connected to the reinforcing member 28 of the seat crossmember 20.

The bolt 45 and the nut 43 for mounting the battery assembly 40 may be directly connected to the reinforcing member 28 so that the battery assembly 40 may be connected to the seat crossmember 20, and thus the connection force and mounting stiffness of the battery assembly 40 may be significantly improved.

Table 1 below shows the results of comparing the fully plastic moment and weight of a seat crossmember according to an exemplary embodiment of the present disclosure with those of a seat crossmember according to the related art. The seat crossmember according to the related art was produced by hot-stamping a material having the following specifications: SABC 1470 (material), 2 t (thickness), SGAFC 780 (material), 1.8 t (thickness). The seat crossmember according to the exemplary embodiment of the present disclosure was produced by roll-forming a material having the following specifications: SPFC 1470 (material), 1.2 t (thickness).

TABLE 1

| | | Related Art | Embodiment of Present Disclosure |
|---|---|---|---|
| Front Seat Crossmember | Fully Plastic Moment | 7061322 | 7035338 (Similar) |
| | Weight | 7.37 kg | 5.07 (−2.3 kg) |
| Rear Seat Crossmember | Fully Plastic Moment | 7167942 | 7551306 (+5%) |
| | Weight | 8.39 kg | 5.61 (−2.7 kg) |
| | Total Weight | 15.77 kg | 10.68 (−5.0 kg) |

As can be seen in Table 1, the seat crossmember according to the exemplary embodiment of the present disclosure obtained the results of increased fully plastic moment and significantly reduced weight, compared to the related art seat crossmember.

Referring to FIG. 1, the plurality of seat crossmembers 20 may be joined to the pair of side sills 12 through the plurality of joint brackets 71 and 72. The plurality of joint brackets 71 and 72 may include a plurality of first joint brackets 71 and a plurality of second joint brackets 72. For example, the pair of first joint brackets 71 may be joined to both end portions of the seat crossmember 20 located on the rear of the floor 11, and thus the end portions of the seat crossmember 20 may be joined to the corresponding side sills 12 through the first joint brackets 71, respectively. The pair of second joint brackets 72 may be joined to both end portions of the seat crossmember 20 located on the front of the floor 11, and thus the end portions of the seat crossmember 20 may be joined to the corresponding side sills 12 through the second joint brackets 72, respectively.

Figure 5:
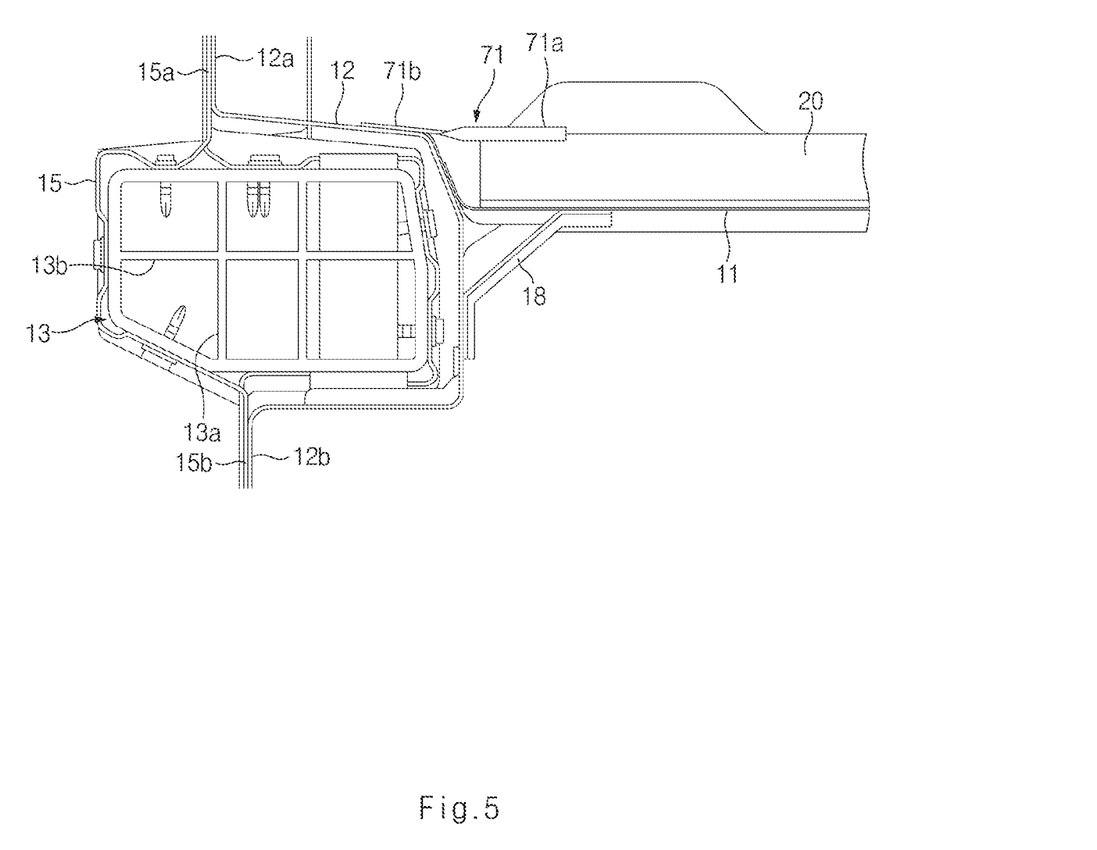
FIG. 5 illustrates a cross-sectional view taken along line B-B of FIG. 1.

Referring to FIG. 5, the first joint bracket 71 may include a first inner flange 71a facing the interior of the vehicle, and a first outer flange 71b facing the exterior of the vehicle.

The first inner flange 71a may have a shape corresponding to an exterior surface of the seat crossmember 20, and thus the first inner flange 71a may be firmly joined to each end portion of the seat crossmember 20 by welding, using fasteners, and/or the like.

The first outer flange 71b may have a shape corresponding to an interior surface of the side sill 12, and thus the first outer flange 71b may be firmly joined to the interior surface of the side sill 12 by welding, using fasteners, and/or the like.

Figure 6:
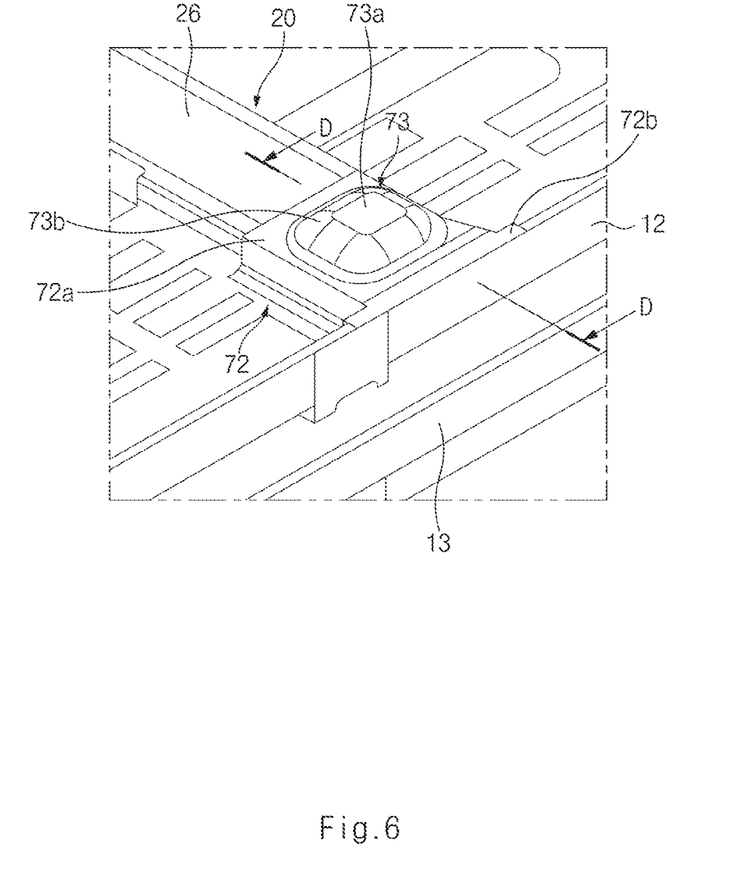
FIG. 6 illustrates an enlarged view of portion C of FIG. 1.
Figure 7:
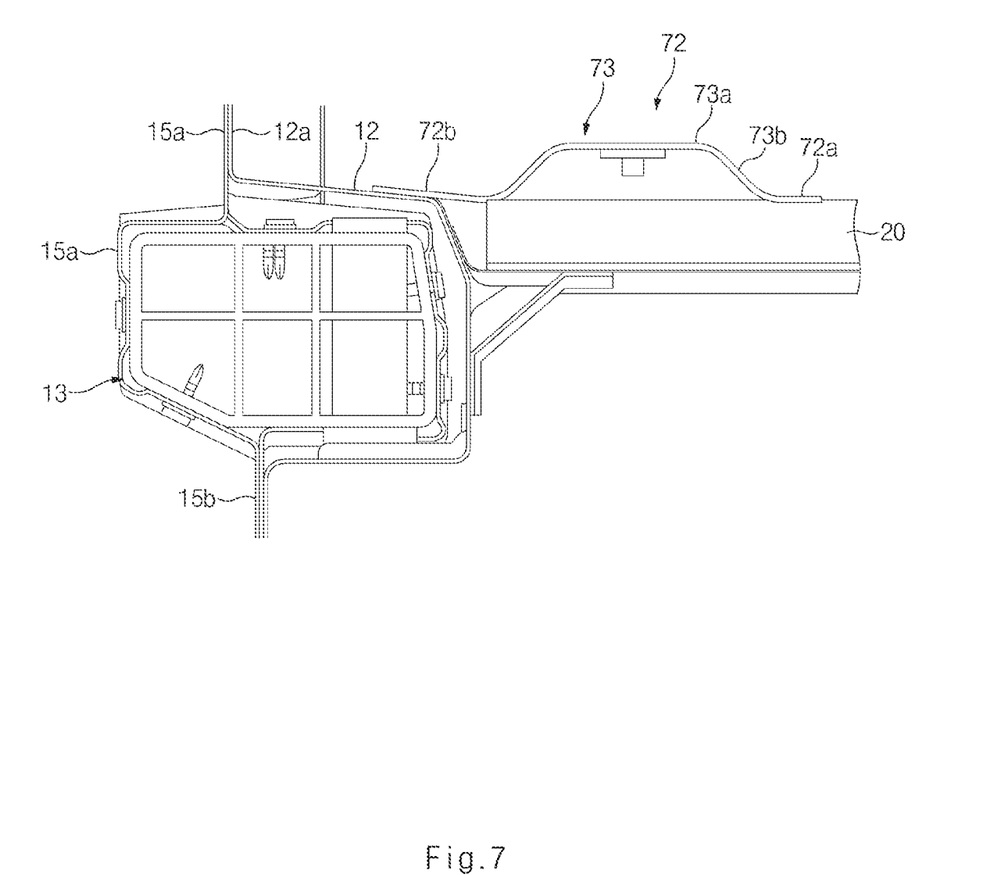
FIG. 7 illustrates a cross-sectional view taken along line D-D of FIG. 6.

Referring to FIGS. 6 and 7, the second joint bracket 72 may include a second inner flange 72a facing the interior of the vehicle, a second outer flange 72b facing the exterior of the vehicle, and a seat mounting portion 73 raised upwardly from the second inner flange 72a.

The second inner flange 72a may have a shape corresponding to the exterior surface of the seat crossmember 20, and thus the second inner flange 72a may be firmly joined to each end portion of the seat crossmember 20 by welding, using fasteners, and/or the like.

The second outer flange 72b may have a shape corresponding to the interior surface of the side sill 12, and thus the second outer flange 72b may be firmly joined to the interior surface of the side sill 12 by welding, using fasteners, and/or the like.

The seat mounting portion 73 may include a mount 73a on which the vehicle seat is mounted using fasteners and/or the like, and an inclined wall 73b extending from an edge of the mount 73a to the second inner flange 72a. An outermost vehicle seat among the vehicle seats may be mounted on the seat mounting portion 73 using fasteners, brackets, and/or the like.

The second joint bracket 72 may perform the function of a seat mounting bracket for mounting the outermost vehicle seat in addition to the function of joining the seat crossmember 20 to the side sill 12.

By joining the outer flanges 71b and 72b of the joint brackets 71 and 72 to the side sill 12, the joint brackets 71 and 72 may be deformed with the side sill 12 and the side sill reinforcement 13 due to impact energy in the event of a side impact of the vehicle. By joining the inner flanges 71a and 72a of the joint brackets 71 and 72 to the end portions of the seat crossmembers 20, the joint brackets 71 and 72 may maintain the connections with the seat crossmembers 20 even during the side impact of the vehicle. That is, the joint brackets 71 and 72 may absorb the impact energy during the side impact of the vehicle, thereby improving crashworthiness and stiffness of the vehicle body.

The side sill reinforcement 13 may be an extruded product formed by an extruding method, and extend in the longitudinal direction of the side sill 12. The side sill reinforcement 13 may have a plurality of vertical ribs 13a and a plurality of horizontal ribs 13b. The side sill reinforcement 13 may be mounted in an interior space of the side sill 12 using a plurality of mounting brackets 15.

Referring to FIGS. 5 and 7, each side sill 12 may have a top flange 12a extending vertically and upwardly from a top end thereof, and a bottom flange 12b extending vertically and downwardly from a bottom end thereof. Each mounting bracket 15 may have a top flange 15a extending vertically and upwardly from a top end thereof, and a bottom flange 15b extending vertically and downwardly from a bottom end thereof. The top flange 15a of the mounting bracket 15 may be joined to the top flange 12a of the side sill 12, and the bottom flange 15b of the mounting bracket 15 may be joined to the bottom flange 12b of the side sill 12.

Referring to FIGS. 1, 5, and 7, at least some mounting brackets 15 among the plurality of the mounting bracket 15 may be aligned with the joint brackets 71 and 72, so that the mounting brackets 15 and the joint brackets 71 and 72 may be aligned with a longitudinal axis of the seat crossmember 20. Thus, the support stiffness of the seat crossmember 20 may be increased.

Figure 8:
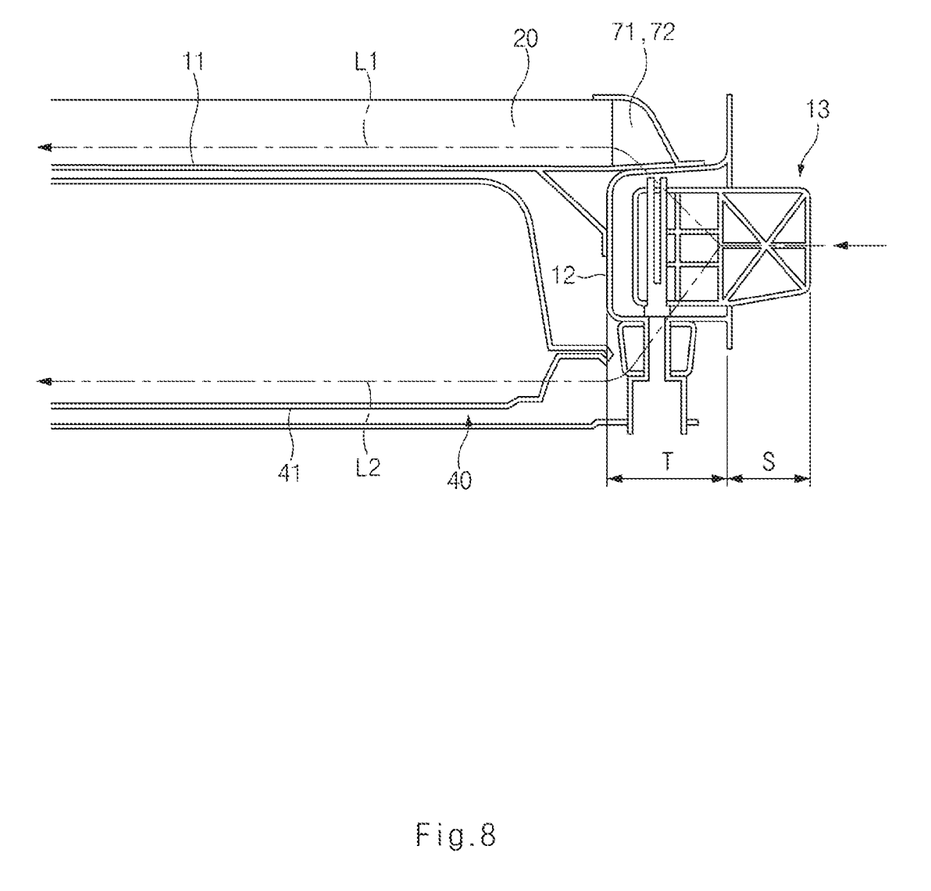
FIG. 8 illustrates load distribution paths of a vehicle floor structure according to an exemplary embodiment of the present disclosure.

Referring to FIG. 8, as the impact energy in the side impact of the vehicle is applied to the side sill reinforcement 13, the side sill reinforcement 13 may completely collapse in an impact absorption area S to thereby absorb the impact energy. When the non-absorbed impact energy is transmitted to the joint brackets 71 and 72, the side sill 12, and the side sill reinforcement 13, the joint brackets 71 and 72 may be deformed with the side sill 12 and the side sill reinforcement 13 in a deformation area T. Finally, the impact energy may be distributed through a first load path L1 defined by the seat crossmember 20 and a second load path L2 defined by the battery case 41 of the battery assembly 40. In particular, the battery case 41 of the battery assembly 40 may be directly connected to the reinforcing member 28 of the seat crossmember 20 through the bolt 45 and the nut 43 so that the seat crossmember 20 may be prevented from being separated from the battery case 41 of the battery assembly 40, and thus the battery assembly 40 may be safely protected.

As set forth above, the seat crossmember according to exemplary embodiments of the present disclosure may have the plurality of closed cavities, thereby improving its own stiffness and strength, which leads to improved crashworthiness and improved stiffness. Its weight may be significantly reduced compared to the related art seat crossmember, and thus effectively making the vehicle lightweight.

According to exemplary embodiments of the present disclosure, the reinforcing member attached to the bottom surface of the seat crossmember may support the nut for mounting the battery assembly, and the bolt passing through the battery case of the battery assembly may be fastened to the nut so that the battery assembly may be directly connected to the seat crossmember, and thus the connection force and mounting stiffness of the battery assembly may be significantly improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A seat crossmember, comprising:
  a base having a first edge and a second edge opposing to the first edge;
  a first reinforcing portion connected to the first edge of the base, wherein the first reinforcing portion has a first cavity; and
  a second reinforcing portion connected to the second edge of the base, wherein the second reinforcing portion has a second cavity and wherein the first reinforcing por- tion and the second reinforcing portion are spaced apart from each other in a width direction of the seat crossmember.

2. The seat crossmember according to claim 1, wherein the first cavity and the second cavity are closed cavities.

3. The seat crossmember according to claim 1, wherein:
the first reinforcing portion and the second reinforcing portion protrude upwardly from the base; and
the first reinforcing portion, the second reinforcing portion, and the base define a third cavity.

4. The seat crossmember according to claim 1, further comprising an upper member disposed above the base, wherein the upper member is joined to the first reinforcing portion and the second reinforcing portion to close a top of a third cavity.

5. The seat crossmember according to claim 1, further comprising a reinforcing member attached to a bottom surface of the base, wherein the reinforcing member supports a nut for mounting a battery assembly.

6. A vehicle floor structure, comprising:
a floor disposed on a bottom of a vehicle body;
a plurality of seat crossmembers extending in a width direction of a vehicle;
a pair of side sills disposed on both sides of the floor; and
a pair of side sill reinforcements mounted in the pair of side sills, respectively;
wherein each seat crossmember includes a base having a first edge and a second edge opposing to the first edge, a first reinforcing portion integrally connected to the first edge of the base, and a second reinforcing portion integrally connected to the second edge of the base; and
wherein, for each seat crossmember, the first reinforcing portion and the second reinforcing portion are spaced apart from each other in a width direction of the seat crossmember.

7. The vehicle floor structure according to claim 6, wherein the plurality of seat crossmembers are joined to the pair of side sills through a plurality of joint brackets.

8. The vehicle floor structure according to claim 7, wherein each joint bracket includes an inner flange joined to an end portion of a respective one of the seat crossmembers, and an outer flange joined to the side sill.

9. The vehicle floor structure according to claim 8, wherein:
each side sill reinforcement is mounted in the respective side sill through a plurality of mounting brackets; and
at least some mounting brackets among the plurality of mounting brackets are aligned with the plurality of joint brackets.

10. The vehicle floor structure according to claim 8, wherein at least some joint brackets among the plurality of joint brackets further include a seat mounting portion raised upwardly from the inner flange.

11. The vehicle floor structure according to claim 6, wherein:
each seat crossmember further includes a reinforcing member attached to a bottom surface of the base;
the reinforcing member supports a nut; and
a bolt is fastened to the nut while passing through a battery case of a battery assembly.

12. The seat crossmember according to claim 3, wherein the first cavity and the second cavity are closed cavities.

13. The seat crossmember according to claim 4, wherein the first cavity and the second cavity are closed cavities.

14. The seat crossmember according to claim 5, wherein the first cavity and the second cavity are closed cavities.

15. The seat crossmember according to claim 4, wherein:
the first reinforcing portion and the second reinforcing portion protrude upwardly from the base; and
the first reinforcing portion, the second reinforcing portion, and the base define the third cavity.

16. The seat crossmember according to claim 5, wherein:
the first reinforcing portion and the second reinforcing portion protrude upwardly from the base; and
the first reinforcing portion, the second reinforcing portion, and the base define a third cavity.

17. The seat crossmember according to claim 5, further comprising an upper member disposed above the base, wherein the upper member is joined to the first reinforcing portion and the second reinforcing portion to close a top of a third cavity.

18. A seat crossmember, comprising:
a base having a first edge and a second edge opposing to the first edge;
a first reinforcing portion connected to the first edge of the base, wherein the first reinforcing portion has a first closed cavity;
a second reinforcing portion connected to the second edge of the base, wherein the second reinforcing portion has a second closed cavity;
an upper member disposed above the base, wherein the upper member is joined to the first reinforcing portion and the second reinforcing portion to close a top of a third cavity; and
a reinforcing member attached to a bottom surface of the base, wherein the reinforcing member supports a nut for mounting a battery assembly;
wherein the first reinforcing portion and the second reinforcing portion are spaced apart from each other in a width direction of the seat crossmember;
wherein the first reinforcing portion and the second reinforcing portion protrude upwardly from the base; and
wherein the first reinforcing portion, the second reinforcing portion, and the base define the third cavity.

* * * * *